Oct. 28, 1941.  J. J. DUNN  2,261,056
METHOD OF MAKING THREADED JOINT MEMBERS
Filed Nov. 8, 1939
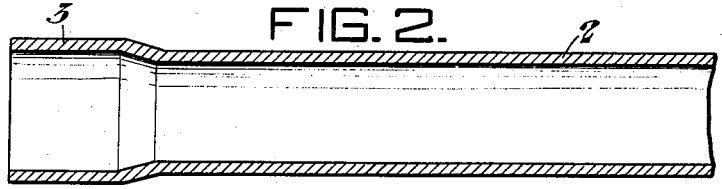
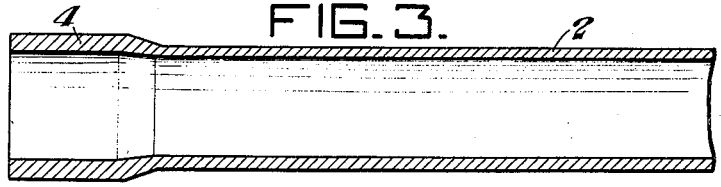
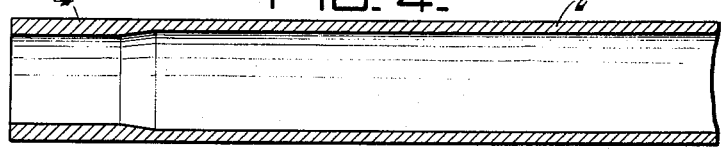
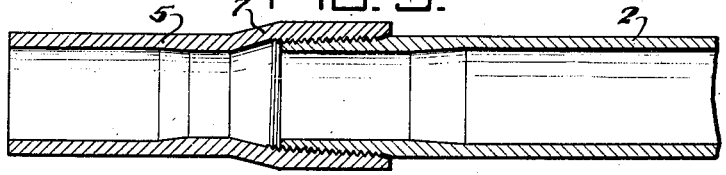
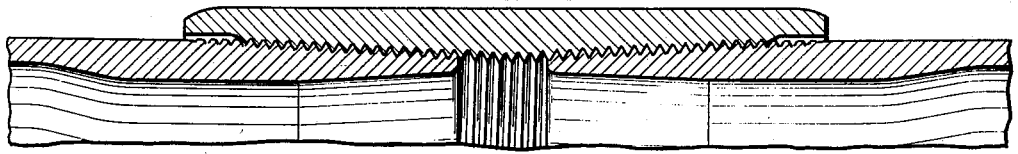
Inventor:
JERRY JAY DUNN,
by John E. Jackson
His Attorney.

Patented Oct. 28, 1941

2,261,056

UNITED STATES PATENT OFFICE 2,261,056

METHOD OF MAKING THREADED JOINT MEMBERS

Jerry Jay Dunn, Ellwood City, Pa., assignor to National Tube Company, a corporation of New Jersey Application November 8, 1939, Serial No. 303,479

13 Claims. (Cl. 29—148.2)

This invention relates to threaded joints, and more particularly to those used on pipes, sleeves, couplings and the like.

Long lengths of pipe which are assembled by screwing shorter lengths into pipe couplings frequently have the entire weight of the line supported by or imposed upon the threads of the engaged pipe and coupling at one end of the line. The steel pipe lining (called "casing") for oil and water wells is put in place by connecting together with couplings one pipe after another. It is obvious that in this operation each joint of pipe and coupling carries the entire weight of all the pipe below it by means of the engaged threads of the joint. These wells at times reach a depth of two miles or more, which means that the weight carried by the topmost connections must be very great. This explains why the standard threaded and coupled pipe connection must be strong in tension.

The strength in tension of the standard threaded pipe connection is much less than the strength of the pipe itself. The reduction varies with the outside diameter and wall thickness from about 20 to 30 per cent for a pipe of 5 inch diameter to 55 to 65 per cent for a pipe of 14 inch diameter.

Pipe joints have been made with high joint efficiency by using special thread forms which reduce or eliminate the crushing action of the angle of the thread flanks. The objections to such designs are the loss of interchangeability with standard connections and the cost of producing the special thread forms.

It is well known that cold-working increases the tensile properties of steel. The increase takes place in the same direction as the plastic deformation occurring with cold-working. Thus, if a bar is subjected to a tensile stress in the direction of its length such as to cause the bar to be permanently elongated, the tensile strength and the yield strength of the material are increased, the yield strength increasing in much greater proportion than the ultimate strength. The compressive strength of the bar is increased little, if at all.

In standard designs of threaded joints, the pipe which carries the male thread is the weaker member. When loading in tension, it fails by crushing, permitting the pipe to pull out of the other member. If the pipe is of very heavy section compared with the other member of the connection, that member may expand and the connection fail by pulling out, as in the first case. Such pulling apart of the connection frequently occurs at stresses much less than the strength of the pipe material in the direction of the pipe axis, but the tangential stress has exceeded the yield strength of the material.

If the resistance of the material in the joint to tangential stresses is increased, the load causing failure of the joint will be increased correspondingly.

It is among the objects of the present invention to provide a threaded joint of increased tensile strength while maintaining interchangeability by retaining standard threads. "Standard threads" is a term embracing thread shapes that have load carrying flanks inclined with respect to a line perpendicular to the longitudinal axis of the threads such as American Standard (Briggs) Pipe Threads or American Petroleum Institute Standard Threads, and having, as a rule either square or round cut crests and roots.

Another object is to increase the tangential resistance of the material of the threaded joint in the required direction to the desired degree.

The foregoing and other objects will be apparent after referring to the drawing, in which:

Figures 1 through 3 are fragmentary sectional elevations of tubular work-pieces illustrating various stages in the manufacture of the device of the present invention;

Figure 4 is a view similar to Figure 3, but illustrating a modification;

Figures 5 and 6 are fragmentary sectional elevations illustrating two forms of the device of the invention.

Referring more particularly to the drawing, the numeral 2 designates in Figure 1 a tubular pipe of constant wall thickness.

According to the teachings of the present invention, the pipe 2, which is to embody the exterior threads, is expanded adjacent one of its ends, as shown at 3, for a length somewhat greater than the length of the standard thread for the pipe diameter. The expanded portion 3 gradually merges into the pipe 2. The expanding operation is preferably carried out with the pipe at a temperature above the critical point of the material as the subsequent processing is then of greater effect. It is to be understood, however, that heating is not essential for successful accomplishment. The amount of the expansion should be from 3 to 8 or 10 per cent of the pipe diameter. In practice, 3 per cent is found to be a lower practical limit because of the variation in the diameter of the pipe from piece-to-piece and wear of dies. Some pieces would secure much less than 3 per cent expansion; 6 to 8 per cent is found to be nearly ideal for the purpose.

In the expanding operation, the pipe wall may be increased, as shown at 4 in Figure 3, by a simultaneous upsetting action, thereby increasing the cross sectional area under the root of the thread, thus adding directly or nearly so to the ultimate strength of the joint. A relatively small increase in the wall thickness by such upsetting action, combined with the subsequent cold-working of the material, results in a strength of the joint at least equal to that of the pipe 2. The combination of upsetting to increase the wall thickness and the cold-work is advisable when the joint is to have the full strength of the pipe, as by this combination the desired strength is obtained without materially increasing the section of the joint. This fact is of value in the use of pipe in deep wells where the space limitations restrict joint design.

Following the expansion, the pipe 2 is preferably normalized over its entire length. This is not essential, but it adds to the strength when the object is to attain the maximum.

After expanding (with or without increase in wall thickness) and after normalizing (when this operation is employed) the pipe 2 is reduced to its original outside diameter (either without upset, as shown in Figure 1, or with the upset, as shown in Figure 4) while at any suitable temperature which is below the lower limit of the blue brittleness range (i. e. 200 degrees centigrade). The reduction may be affected by pulling or pushing the pipe through a die of proper diameter, by reducing in hammer dies, or by pressing in semi-circular dies (none of which is shown). Due to the gradual merging of the expanded portion 3 into the pipe 2, when the expanded portion and the gradual merging portion are cold-reduced, there is obtained a connecting zone between the cold-reduced portion and the pipe in which there is a gradual progression in the amount of cold-working.

The pipe, or coupling, 5 which is to embody the interior threads, is expanded 3 to 8 or 10 per cent of its diameter by a cold-working operation, but it is not restored to its initial diameter, as in the case of the pipe 2. Thus the pipe 2 receives 3 to 10 per cent cold-work in compression while the pipe or coupling 5 receives 3 to 10 per cent cold-work in expansion, the finished diameters being calculated to arrive at a proper joint after threading.

The expanding operation may be made to result in a conical, instead of a cylindrical surface, and the cold-working operation may also produce a conical, instead of a cylindrical surface. By these means, the stock that must be removed in cutting the thread is reduced and the degree of cold-work effect varied along the length of the thread to meet any desired distribution.

The threaded pipe so produced is connected by couplings of usual design and dimensions. When these are used and made of a material of the same strength as the pipe 2, failure will occur in the pipe and not in the coupling because standard design of pipe joint usually has an excess of metal in the exterior member carrying the female thread. In such case, the cold-work need only be applied to the interior member which is to carry the male thread. For some purposes, a coupling of the minimum diameter may be required. The increased strength of the material needed to compensate for the reduced cross sectional area is readily obtained by cold-working. The cold-work, to be effective for the purpose, must expand the diameter of the coupling instead of reducing the diameter, as is done with the pipe.

By means of cold-working the pipe 5 in an expanding operation after a hot-upsetting operation and if desired a normalizing operation, and cold-compressing the end of the pipe 2, the connection may be of the bell and spigot type, as shown in Figure 5. As shown at 7 there is an inclined zone connecting the cold expanded with the unexpanded portion in which there is a gradual progression in the amount of cold-working.

In Figure 6 there is shown the design of the improved joint using the conventional coupling with the wall of the pipe increased by upsetting prior to the cold-work application to the expanded pipe end.

While I have shown and described several specific embodiments of the present invention, it will be seen that I do not wish to be limited exactly thereto, since various modifications may be made without departing from the scope of the invention, as defined by the following claims.

I claim:

1. The method of increasing the efficiency of standard tubular threaded joints comprising an interiorly and an exteriorly threaded member, which includes expanding an end portion of a tubular member in such manner that the expanded portion gradually merges into the unexpanded portion of the tubular member, then cold-reducing said expanded and merging portion an amount sufficient to reduce the diameter thereof between 3 and 10 per cent, and subsequently cutting standard screw threads on the exterior of said cold-reduced end portion.

2. The method of increasing the efficiency of standard tubular threaded joints comprising an interiorly and an exteriorly threaded member, which includes expanding an end portion of a tubular member while at a temperature above the critical point of its material in such manner that the expanded portion gradually merges into the unexpanded portion, then cold-reducing said expanded and merging portion an amount sufficient to reduce the diameter thereof between 3 and 10 per cent, and subsequently cutting standard screw threads on the exterior surface of said cold-reduced end portion.

3. The method of increasing the efficiency of standard tubular threaded joints comprising an interiorly and exteriorly threaded member which, includes expanding an end portion of a tubular member while at a temperature above the critical point of its material in such manner that the expanded portion merges gradually into the unexpanded portion, normalizing said tubular member, then cold-reducing said expanded end an amount sufficient to reduce the diameter thereof between 3 and 10 per cent, and subsequently cutting standard screw threads on the exterior surface of said cold-reduced end portion.

4. The method of increasing the efficiency of standard tubular threaded joints having an interiorly and an exteriorly threaded member which, includes upsetting and expanding an end portion of a tubular member so that the upset and expanded portion gradually merges into the portion not so treated, then cold-reducing said upset and expanded end portion an amount sufficient to reduce the diameter thereof between 3 and 10 per cent, and subsequently cutting standard screw threads on the exterior surface of said end.

5. The method of increasing the efficiency of standard tubular threaded joints having an interiorly and an exteriorly threaded member which, includes upsetting and expanding an end portion of a tubular member while at a temperature above the critical temperature of its material in such manner that the upset and expanded portion gradually merges into the portion not upset and expanded, then cold-reducing said upset and expanded portion an amount sufficient to reduce the diameter thereof between 3 and 10 per cent, and subsequently cutting standard screw threads on the exterior surface thereof.

6. The method of increasing the efficiency of standard tubular threaded joints comprising an interiorly and an exteriorly threaded member which, includes expanding and upsetting an end portion of a tubular member while at a temperature above the critical point of its material in such manner that the expanded and upset portion merges gradually into the portion not upset and expanded, normalizing said tubular member, then cold-reducing said expanded and upset portion an amount sufficient to reduce the diameter thereof between 3 and 10 per cent, and subsequently cutting standard screw threads on the exterior surface of said cold-reduced end portion.

7. The method of increasing the efficiency of standard tubular threaded joints comprising an interiorly and an exteriorly threaded member which, includes upsetting an end portion of a tubular member to increase its wall thickness, then cold-expanding said upset end portion an amount sufficient to increase the diameter thereof between 3 and 10 per cent and in such manner that the cold-expanded portion gradually merges into the unexpanded portion, and subsequently cutting standard screw threads on the interior surface thereof.

8. The method of increasing the efficiency of standard tubular threaded joints comprising an interiorly and an exteriorly threaded member which, includes upsetting an end portion of a tubular member while at a temperature above the critical temperature of the material to increase its wall thickness, then cold-expanding said upset end portion an amount sufficient to incraese the diameter thereof between 3 and 10 per cent and in such manner that the cold-expanded portion gradually merges into the unexpanded portion, and subsequently cutting standard screw threads on the interior surface thereof.

9. The method of increasing the efficiency of standard tubular threaded joints comprising an interiorly and an exteriorly threaded member which, includes upsetting an end portion of a tubular member while at a temperature above the critical temperature of the material to increase its wall thickness in such manner that the upset portion gradually merges into the portion not upset, normalizing said tubular member, then cold-reducing said upset end portion an amount sufficient to reduce the diameter thereof between 3 and 10 per cent, and subsequently cutting standard screw threads on the exterior surface thereof.

10. The method of increasing the efficiency of standard tubular threaded joints comprising interiorly and exteriorly threaded members which, includes expanding a portion of one end of a tubular member in such manner that the expanded portion gradually merges into the unexpanded portion of the tubular member, cold-reducing said expanded portion, upsetting a portion of the other end of said tubular member to increase the wall thickness, then cold-expanding said upset end portion in such manner that the cold-expanded portion gradually merges into the unexpanded portion, and subsequently cutting standard screw threads on the exterior surface of the cold-reduced end portion and on the interior surface of the cold-expanded end portion, the amount of change in diameter effected by said cold-reducing step and said cold-expanding step being not more than 10 per cent and not less than 3 per cent.

11. The method of increasing the efficiency of standard tubular threaded joints comprising interiorly and exteriorly threaded members which, includes expanding a portion of one end of a tubular member while at a temperature above the critical point of its material in such manner that the expanded portion gradually merges into the unexpanded portion, upsetting the opposite end of said tubular member while at a temperature above the critical temperature of the material to increase the wall thickness, then cold-reducing the hot-expanded end portion, cold-expanding the hot upset end portion in such manner that the cold-expanded portion gradually merges into the unexpanded portion, and subsequently cutting standard screw threads on the exterior surface of the cold-reduced end portion and on the interior surface of the cold-expanded end portion, the amount of change in diameter effected by said cold-reducing step and said cold-expanding step being not more than 10 per cent and not less than 3 per cent.

12. The method of increasing the efficiency of standard tubular threaded joints comprising interiorly and exteriorly threaded members which, includes expanding one end of a tubular member while at a temperature above the critical point of its material in such manner that the expanded portion gradually merges into the unexpanded portion, upsetting the opposite end of said tubular member while at a temperature above the critical temperature of its material to increase the wall thickness, then cold-reducing the hot expanded end portion, cold-expanding the hot upset end portion in such manner that the cold-expanded portion gradually merges into the unexpanded portion normalizing said tubular member, and subsequently cutting standard screw threads on the exterior surface of the cold-reduced end portion and on the interior surface of the cold-expanded end portion, the amount of change in diameter effected by said cold-reducing step and said cold-expanding step being not more than 10 per cent or less than 3 per cent.

13. The method of increasing the efficiency of tubular threaded joints having an interiorly and an exteriorly threaded member, which includes upsetting an end portion of a tubular member to increase its wall thickness while at a temperature above the critical temperature of its material in such manner that the upset portion gradually merges into the portion not upset, then cold-reducing said upset portion an amount sufficient to reduce the diameter thereof bewteen 3 and 10 per cent, and subsequently cutting screw threads on the exterior surface of said end which have load carrying flanks inclined with respect to a line perpendicular to the longitudinal axis of the threads.

JERRY JAY DUNN.